(No Model.) 5 Sheets—Sheet 2.

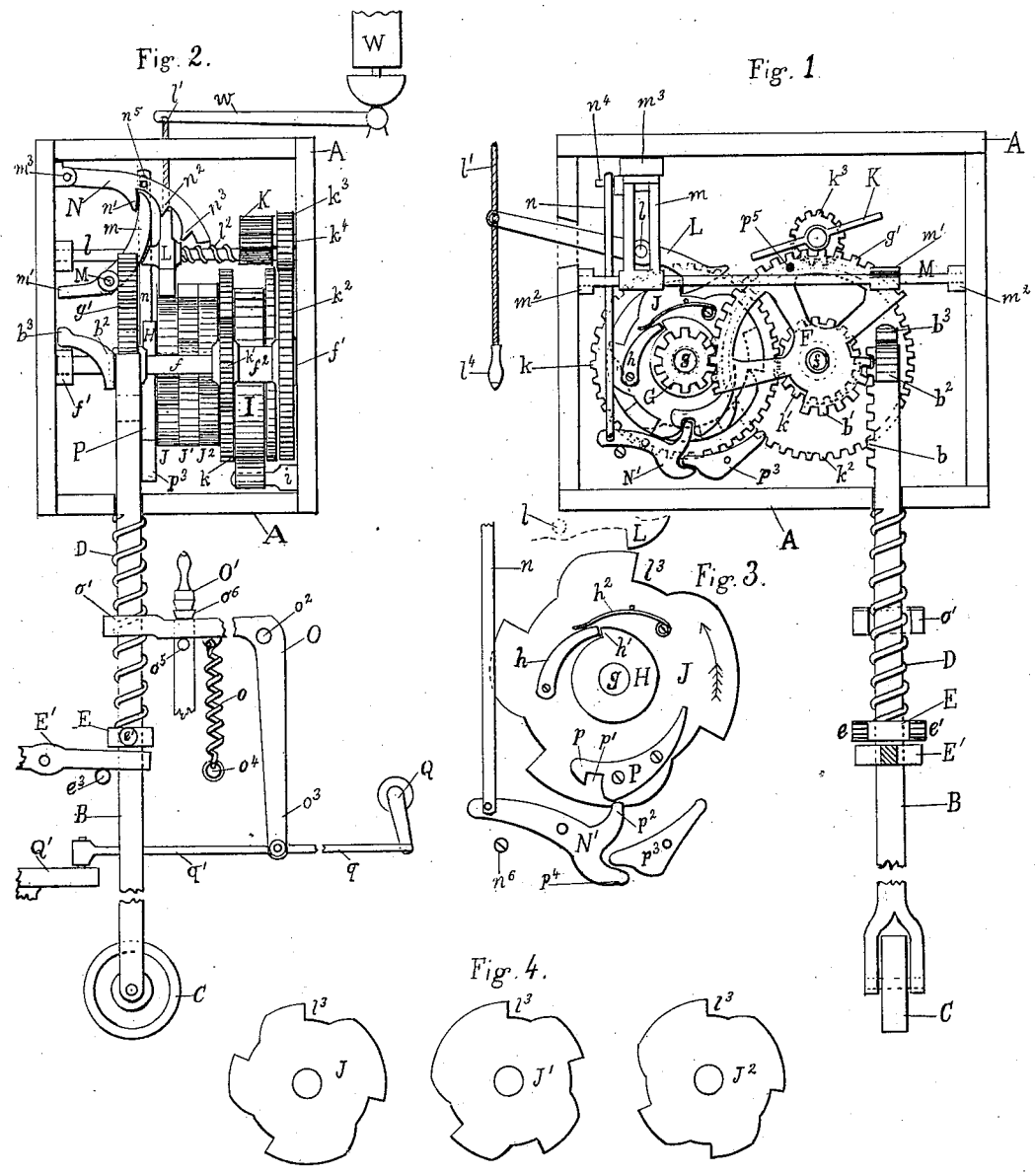

E. E. RIES.
AUTOMATIC ALARM, SIGNALING, AND SAFETY DEVICE FOR RAILWAYS.

No. 334,194. Patented Jan. 12, 1886.

WITNESSES:
Leopold Ries
Louis Oettinger

INVENTOR
Elias E. Ries (No Model.) 5 Sheets—Sheet 3.
E. E. RIES.
AUTOMATIC ALARM, SIGNALING, AND SAFETY DEVICE FOR RAILWAYS.
No. 334,194. Patented Jan. 12, 1886.
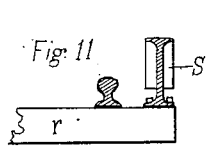
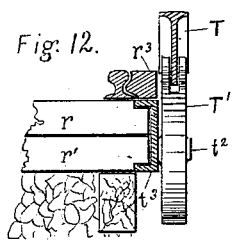
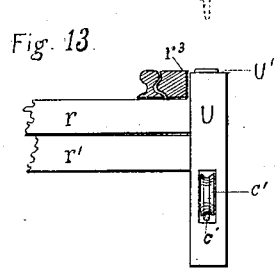
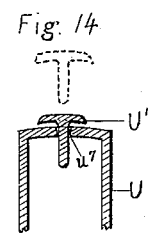
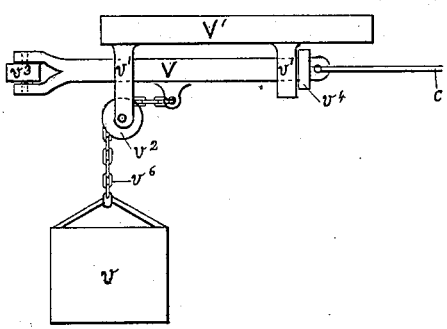
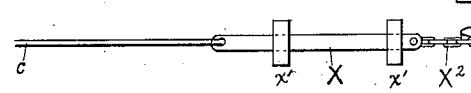
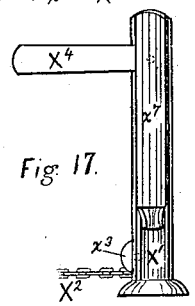
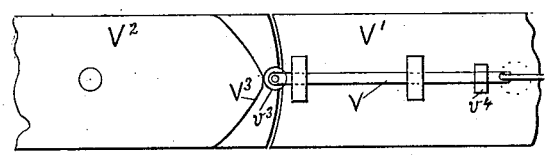
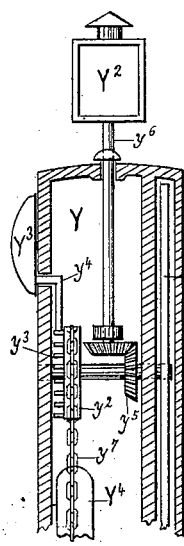
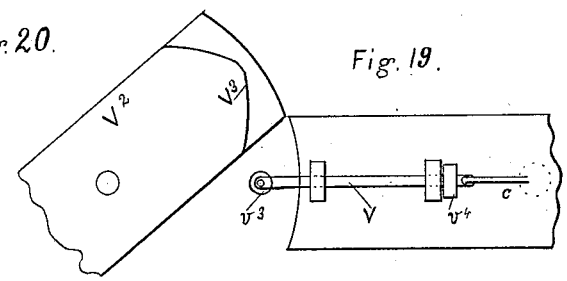
WITNESSES:
Leopold Ries
Louis Oettinger
INVENTOR
Elias E. Ries (No Model.) 5 Sheets—Sheet 4.

E. E. RIES.
AUTOMATIC ALARM, SIGNALING, AND SAFETY DEVICE FOR RAILWAYS.

No. 334,194. Patented Jan. 12, 1886.

WITNESSES:
Leopold Ries
Louis Oettinger

INVENTOR
Elias E. Ries (No Model.) 5 Sheets—Sheet 5.

E. E. RIES.
AUTOMATIC ALARM, SIGNALING, AND SAFETY DEVICE FOR RAILWAYS.

No. 334,194. Patented Jan. 12, 1886.

WITNESSES:
Leopold Ries
Louis Oettinger

INVENTOR
Elias E. Ries

UNITED STATES PATENT OFFICE.

ELIAS E. RIES, OF BALTIMORE, MARYLAND, ASSIGNOR OF ONE-FOURTH TO ALBERT H. HENDERSON, OF SAME PLACE.

AUTOMATIC ALARM SIGNALING AND SAFETY DEVICE FOR RAILWAYS.

SPECIFICATION forming part of Letters Patent No. 334,194, dated January 12, 1886.

Application filed February 13, 1884. Serial No. 120,680. (No model.)

*To all whom it may concern:*

Be it known that I, ELIAS E. RIES, a citizen of the United States, residing at Baltimore, in the State of Maryland, have invented certain new and useful Improvements in Automatic Alarm Signaling and Safety Devices for Railways, of which the following is a specification, reference being had to the accompanying drawings, forming a part thereof.

This invention relates to certain improvements in railroad-signals, by means of which the whistle of a locomotive is automatically sounded to give warning of the approach of a train when nearing grade and highway crossings, way-stations, curves, and other points at which it may be desired to give such notice.

It further relates to certain improvements whereby one or more audible alarm-signals are given on the locomotive-whistle in case of the failure of the engine-man to see and obey a danger-signal, or in case of danger to the train from a misplaced switch, open drawbridge, or other source; and it further relates to improvements in safety devices, by means of which the train is automatically stopped or its speed reduced as desired, in case of the failure or neglect of the engine-man to bring his train under control when notified to do so by such warning-signals.

The invention consists, first, of a signaling apparatus on the locomotive, designed and adapted to give a series of audible signals, differing in form and nature, according to a prearranged code, upon the locomotive-whistle or other sounding body, the signaling apparatus being automatically operated to give such signals through the medium of a vertically-guided bar connecting with said apparatus and having a friction roller or shoe at its lower end, by means of inclines or elevations placed adjacent to the track-rails at various points along the road.

It consists, secondly, in details of construction whereby the alarm mechanism or signaling apparatus is enabled to give its signals in a uniform and regular manner, irrespective of the speed of the train or the length of the actuating inclines or elevations, and whereby the signal mechanism is protected from shocks due to the sudden ascent of the alarm-inclines by the vertically-guided bar. This I accomplish by causing the act of elevating the bar, not to operate the signal mechanism directly but to increase the tension of a coiled or spiral spring, which in turn, in the act of unwinding, operates the signal mechanism and at the same time sets in motion a suitable governing or speed-regulating device, which determines the duration of the several signals.

It consists, thirdly, in employing inclines or elevations of different heights to produce different signals, and in mechanical details by which the signal mechanism is enabled to respond to and give the proper signals corresponding to such different heights.

The invention consists, fourthly, of suitable devices operated by a collar or projection on the vertical bar when said bar is lifted to its highest extent, which, in the manner hereinafter shown, closes the steam-supply valve, applies the brakes, and stops the train. This part of my invention includes details of construction by which the extent to which the steam is shut off and the brakes applied is automatically regulated, and whereby the respective parts are held in the position in which they are placed until released by the engineer.

The invention consists, fifthly, of a series of movable inclined planes or elevations arranged alongside of the track-rail, which are so constructed as to extend above the surface of the rail when intended to give an alarm-signal on the whistle of a locomotive, and to lie below or parallel with the surface of the rail when not required to give an alarm. This part of the invention further consists in mechanical details for elevating and depressing the inclined planes, for retaining them in their respective positions, and for protecting the various parts from injury. It further consists in details of construction whereby variations in the length of the rods, wire rope, or cable connecting the alarm inclines with one another and with the switch or draw-bridge are compensated for, in order to insure the proper operation of the alarm-inclines under all conditions.

The invention consists, sixthly, in suitable devices operated in connection with the alarm-inclines, at switches, draw-bridges, and other points, to elevate the alarm-inclines when the switch is moved to one side, when the draw of a bridge is opened, or when the track is otherwise placed in a position of danger to an approaching train, and to restore them to their depressed or normal condition when the switch or draw is replaced or the danger is removed. This part of the invention also includes suitable mechanism for displaying a visible signal and ringing a gong or bell at the draw-bridge as the bridge opens and closes, all of which will hereinafter be fully described, and finally referred to in the claims.

In the drawings accompanying this specification, Figure 1 is a side elevation of the alarm mechanism carried on the locomotive. Fig. 2 is an end view of the same with part of case removed. The lower portion of this figure also gives a side view of the train-stopping mechanism connected with it. Fig. 3 is an enlarged detail view of that portion of Fig. 1 comprising the first signal-wheel and the cams, detents, and trip-levers immediately connected therewith. Fig. 4 is a detail view of the three signal-wheels, and Fig. 5 a diagram of the respective signals given by them. Fig. 6 is a diagram of a railroad-switch, giving a top view of the movable alarm-plane and showing the method of connecting it with the switch-lever. Fig. 7 is a diagram of a railroad-track, giving a top view of the signal or alarm planes shown in Figs. 8 and 9. Fig. 8 is a side elevation of the fixed inclined plane used for crossing and station signals. Fig. 9 is a side elevation of a movable signal-plane operated by the switch or draw-bridge. Fig. 10 shows a side elevation, with part of its casing removed, of a compensating form of signal-plane for draw-bridge and switch signals. Figs. 11, 12, and 13 represent, respectively, sectional end views of the inclined planes shown in Figs. 8, 9, and 10, said views being taken on lines 1 1, 2 2, and 3 3, respectively. Fig. 14 is a cross-section of the upper part of Fig. 10. Fig. 15 is a side elevation of the operating apparatus placed at the draw-bridge. Fig. 16 is a sectional, and Fig. 17 a perspective, elevation of the visual-signal and the weight-actuated returning-bar placed at the distant end of the switch or draw-bridge signal-system. Fig. 18 is a diagram of the under surface of a draw-bridge with draw closed, and Fig. 19 a diagram of same with draw open, illustrating the action of the bridge upon the actuating draw-bar. Fig. 20 is a sectional elevation of the visual and audible signal-post shown in Figs. 21 and 22. Fig. 21 represents a general view, in three parts, of a draw-bridge with its approach and a portion of a railroad-track, showing the method in which in this system the alarm-planes, &c., are preferably arranged and connected with each other and with the bridge. Fig. 22 is a perspective elevation of the signal-post shown in Figs. 20 and 21. Fig. 23 is a side elevation of a locomotive and part of a railroad-track, giving a general view of the alarm mechanism and train-stopping apparatus on the locomotive, and showing an alarm-plane alongside of the track in an elevated or operative position.

Similar letters of reference indicate corresponding parts.

Referring to the drawings, A represents a box or case containing the whistle-operating mechanism, placed, preferably, in the interior of the cab of a locomotive.

B is a vertically-guided rod provided with a friction-roller, C, at its lower extremity, and having a rack or teeth, $b$, formed on its upper end. This rod B is encircled by a spiral spring, D, which bears downwardly against a collar, E, secured to the rod B, and aids in returning said rod to its lowest position after being lifted by one of the inclined planes along the road, and also in revolving the signal-wheels. The rack $b$ extends into the casing A of the alarm mechanism and engages with the smaller sector, $b'$, of a double segmental toothed lever, F, secured to the shaft $f$, supported in bearings $f'$ $f'$, formed on the frame or case A. The larger sector, $g'$, of the toothed lever F engages with a smaller toothed wheel or pinion, G, keyed to a shaft, $g$, that runs parallel to the shaft $f$, and, like it, revolves in bearings on opposite sides of case A.

The object in using this form of segmental lever is to obtain a large movement of the pinion G with a small lift of the rack $b$, although where this is not essential an ordinary gear and pinion keyed to the shaft $f$ may be used.

Fixed on the same shaft with the pinion G is a ratchet or cam, H, provided with a single tooth or notch, $h'$, adapted to engage with a pawl, $h$, held against the periphery of the cam-wheel H by the spring $h^2$. A coiled spring, I, is secured at its inner end to the shaft $g$, while its outer end is fastened to a pin or stud, $i$, screwed into one side of the case A.

On the shaft $g$, preferably between the toothed cam H and the spring I, are one or more signal-wheels — in this instance three. These signal-wheels J J' J², including a gear-wheel, $k$, fit loosely upon the shaft $g$, but are firmly fastened to each other and revolve together when the pawl $h$, which is secured to the first signal-wheel, J, is engaged by the tooth $h'$ of the cam H. A signal-lever, L, is placed above the signal-wheel J upon a shaft, $l$, on which it is free to move. The shorter end of this lever, which is formed somewhat like a latch-head, is held against the periphery of the signal-wheel J by the upward pull of the whistle-lever $w$, with which its longer arm is connected by a cord or wire, $l'$. The signal-wheels J J' J² are of the same size and thickness, and are each provided with a series of notches or depressions in their periphery, these notches, however, being differently situated on the several wheels, as shown in Fig. 4. If, now, the rod B is raised by coming in contact with the inclined surface of an alarm-plane placed at a distance of, say, three or four hundred yards from a highway-crossing, the shorter sector, $b'$, of the segmental lever F is lifted by the rack $b$, causing the longer sector, $g'$, to descend, and in so doing turning the pinion G and toothed cam H backward, or from left to right, thereby increasing the tension of the coiled spring I, which has previously been adjusted to a certain strength. The height of the crossing-alarm-signal plane is so adjusted (for the sake of comparison with others to be hereinafter described, it is assumed to be five inches above the surface of the rail at its highest part) that the large sector, $g'$, will turn the pinion G but a little beyond one revolution. During this time the signal-wheels J, J', and $J^2$ and the gear-wheel $k$ have remained stationary. As soon as the revolution of the shaft $g$ is completed, the pawl $h$ again falls into place against the tooth $h'$, and is held there by the spring $h^2$. The rod B being no longer held up by the inclined plane does not exert any further tension on the coiled spring I, thus leaving the latter free to unwind and utilize the energy it received, which it does by turning the shaft $g$, the pinion G, and cam H in the opposite direction, and, through the medium of the pawl $h$, turning the signal-wheels J, J', and $J^2$ and gear-wheel $k$ with it in the direction of the arrow, Fig. 3. As the signal-wheels revolve, the signal-lever L, which is held against the signal-wheel J, alternately rises and falls as the elevations or depressions pass under it, and, as the outer arm of the lever L is connected by the rope or rod $l'$ with the lever or valve of the whistle W, said whistle gives a series of blasts exactly corresponding with the elevations on the signal-wheel, which in the present instance is two long, followed by two short, blasts, as shown at $j$, Fig. 5. While the coiled spring I is giving motion to the signal-wheels it is also gradually returning the segmental lever F and rod B to their normal position, in which it is assisted by the pressure of the spiral spring D against the collar E and also by the weight of rod B. When the signal-wheels have made one revolution, their further progress is arrested by mechanism to be shortly described.

The spiral spring D is not absolutely essential to the successful operation of the alarm mechanism; but I prefer to use it in connection with the spring I, to better equalize the resistance of the various parts to prevent backlash between the rack $b$ and the teeth of the lever F, and to insure the prompt return of the rod B to its normal position, although in some cases the springs I and D may both be dispensed with, and the signal-wheels revolved by the weight of the rod B alone.

To regulate the motion of the signal-wheels J J' $J^2$, so as to destroy the inequalities of motion which would otherwise result from the friction of the successive elevations and depressions of said wheels upon the face of the signal-lever L, as well as for the purpose of regulating the time of revolution of the said signal-wheels, I employ an ordinary fan or fly, K, which receives its motion through a train of gear-wheels from the gear-wheel $k$. This gear $k$, as before stated, being firmly secured to and revolving with the signal-wheels, engages with a smaller gear or pinion, $k'$, fixed on one end of a sleeve, $f^2$, which may revolve freely upon the shaft $f$. To the other end of the sleeve $f^2$ is secured a third and larger gear-wheel, $k^2$, which in turn gives motion to the fan-pinion $k^3$, revolving upon a small shaft or post, $k^4$, secured to one side of the case A above the gear-wheel $k^2$.

By the use of the sleeve $f^2$, I obtain an independent motion for the gear-wheels $k'$ and $k^2$ upon the shaft $f$ without regard to the direction or rate of motion of the latter.

Having thus given a general outline of the operation of the alarm mechanism when acted upon by the crossing-alarm plane, I will now describe the method of and devices for automatically changing the form of signal given from a "crossing" signal to either a "misplaced switch," "open draw-bridge," or "down-brakes" signal, as the situation may demand.

The alarm mechanism shown in the drawings, as before stated, is provided with three signal-wheels, J, J', and $J^2$. (Shown in detail in Fig. 4.) The elevations and depressions on the first of these wheels, J, form, when rendered by the whistle of the locomotive, a "crossing-signal," as shown in diagram $j$, Fig. 5, in which the black lines (which represent the blasts given by the whistle) conform to the elevations, and the blank spaces to the depressions, on the periphery of the signal-wheels. In like manner the wheel J' represents a warning-signal, $j'$, which is given in the event of danger from a misplaced switch or an open draw-bridge, and the wheel $J^2$ gives a down brakes or other signal, $j^2$, and is operated in connection with the train-stopping mechanism when a draw-bridge or misplaced-switch signal is disobeyed.

It is understood that the number of signal-wheels used or the specific forms of signals here given may be changed at will to suit the requirements of different roads.

The three signal-wheels are each provided with a common notch or depression, $l^3$, into which the latch end of the signal-lever L falls at the end of each revolution, as shown in Fig. 1. From these notches $l^3$, which are in direct line with each other, the respective signals given by the wheels begin and terminate. The shaft or rod $l$, upon which the signal-lever L moves, extends across the case or frame A a little above the signal-wheels and parallel to the shaft $g$. The lever L, being provided with a wide bearing-surface or hub to insure it against shaking or tilting upon the shaft $l$, is adapted to slide or move upon said shaft, so as to bring it directly over either of the signal-wheels J, J', or $J^2$. One end of the hub of the lever is inclined or tapered and lies in contact with a cam, $m$, whose function is to wipe against the tapered hub of the lever L, and push said lever along the rod $l$, so as to bring it over the required signal-wheel. A spiral spring, $l^2$, bearing against the opposite side of the signal-lever, holds said lever against the cam $m$.

Above the cam $m$, pivoted at $m^2$, is a curved gravity-catch, N, having teeth $n'$ $n^2$ $n^3$ formed on its under side, which teeth are so disposed as to catch the nose of the cam $m$ when said cam is thrown forward to transfer the signal-lever L to the signal-wheel J' or J², and to hold the cam $m$ in this position against the pressure of the spring $l^2$ until the cam is released by the gravity-catch N at the moment when the revolution of the brake-wheels is completed. The cam $m$ is firmly secured to one end of a horizontal rock-shaft, M, supported in bearings $m^2$ $m^2$ in the frame or case A.

Near the opposite end of the rock-shaft M is fixed a short arm, $m'$, projecting from the rock-shaft in an opposite direction to the cam $m$.

To the upper end of the vertical actuating-rod B is attached an inclined guide or a projecting arm, $b^2$, whose upper extremity or tip, $b^3$, is covered with an elastic substance, and is adapted, when the rod B is raised beyond the height required for a crossing-signal, to come in contact with and lift the outer end of the arm $m'$ on the rock-shaft M, thereby moving the said shaft and causing the cam $m$ to extend forward against the side of the signal-lever L, and move said lever along the rod $l$, which, in doing so, compresses the spiral spring $l^2$.

In order that the cam $m$ may exert a uniform pressure upon the side of the signal-lever, I leave a rectangular opening or slot in the central portion of said cam, and adjust it upon the rock-shaft M in such a manner that the two arms of the cam are placed one on each side of the rod $l$, and will therefore bear against both sides of the inclined axis of the signal-lever L.

Instead of providing the cam $m$ with a slot, as stated, the rod $l$ itself may have a longitudinal slot or opening large enough to permit the free movement of the cam $m$ within it, and the signal-lever may have a small anti-friction roller or wheel on one side in line with said slot, against which the cam $m$ will wipe.

At a suitable point of the gravity catch or lever N is a projecting pin or stud, $n^4$, that is free to move within certain limits in a short opening or slot, $n^5$, formed in the upper end of a vertical rod, $n$, that connects the gravity-catch N with one end of a lever, N', pivoted near the bottom of the case A. A pin or stud, $n^6$, limits the downward motion of the rod $n$ and lever N', which latter is of a peculiar shape, and answers a double purpose—that of releasing the wiper-cam $m$ and arresting the progress of the signal-wheels at the end of each revolution. In order to accomplish this object I secure to the face of the signal-wheel J a cam, P, of peculiar form, one end of which terminates in a hook, $p$, forming a recess, $p'$, said recess being diametrically opposite the notch $l^3$.

By referring to Fig. 3 it will be seen that as the signal-wheel J revolves (in the direction of the arrow) the hooked end $p^2$ of the releasing-lever N' gradually ascends the inclined surface of the cam P, and in doing so raises its opposite arm, which in turn, through the agency of the rod $n$, lifts the gravity-catch N, and, at the moment when the lever N' has reached the highest point of the cam P, lifts the said catch clear of the nose of the wiper-cam $m$, which cam is then, under the influence of the spiral spring $l^2$, forced back to the rear tooth, $n'$, its normal position, the signal-lever L being carried along with it. Almost simultaneously with the release of the cam $m$, which occurs at the moment when the signal-lever L, after having given its signal, falls into the line of notches $l^3$, the hook $p^2$ of the lever N' falls into the recess $p'$ and arrests the further progress of the signal-wheels J, J', and J².

To effect the release of the cam P by the lever N' when the alarm mechanism is required to give another alarm-signal, I employ a small gravity trip-lever, $p^3$, the weighted arm of which normally rests upon a second arm, $p^4$, of the lever N'. The weighted arm of this trip-lever is free to describe an arc upward without encountering an obstruction, but when pressed downward bears against the arm $p^4$, thereby depressing the lever N' and causing the hooked end $p^2$ of said lever to release the cam P. The movement of this trip-lever is effected by a pin or projection, $p^5$, on the large sector, $g'$, of the segmental lever F coming in contact with the extremity of the lighter arm of the trip-lever $p^3$.

To illustrate the action of the alarm mechanism as far as at present described, we will suppose a locomotive provided with this apparatus approaching an open draw-bridge and coming in contact with the elevated inclined plane that is intended to operate the alarm. (See Fig. 23.) As the small wheel or friction-roller rides up on the inclined surface of the plane T, it forces the rod B upward, winding up the coiled spring I, Fig. 2. As the draw-bridge planes are somewhat higher (about two inches) than the inclined planes used for the crossing-signals, the rod B is raised until the arm $b^2$ at its upper end lifts the arm $m'$ on the rock-shaft M a distance corresponding to the increase in height of the alarm-plane, thereby throwing the wiper-cam $m$ forward, which is caught and retained by the tooth $n^2$ of the gravity-catch N. By this movement of the cam $m$ the signal-lever L, which has until now remained over the crossing-signal wheel J, is transferred to the second or draw-bridge signal wheel, J'. The large sector, $g'$, of the lever F has now turned the pinion G nearly one and a half revolution, and the pin $p^5$ on the sector has met and cleared the projecting arm of the trip-lever $p^3$. During this time the roller $c$ has left the inclined plane T. The coiled spring I now reasserts its force, and turns the pinion G and toothed cam H toward the pawl $h$. Just before reaching said pawl the pin $p^5$ again comes in contact with the extremity of the trip-lever $p^3$, this time on its lower side, and depresses the heavier arm of said lever against the arm $p^4$ of the lever N' until the hook $p^2$ is lifted out of the recess $p'$ of the cam P. When this occurs, the signal-wheels J, J' and J², the regulating-gearing, and fan K begin to revolve, the trip-lever $p^3$ is released by the pin $p^5$ slipping off the projecting end of the said lever, and the hook $p^2$ of the lever N', being no longer supported by the cam P, allows the weight of the rod $n$ to push the lever N' against the stop $n^6$, where it remains while the signal-lever L is giving the draw-bridge alarm on the whistle W. As the revolution of the signal-wheels nears completion and the cam P again approaches the arm $p^2$, the said arm gradually rises as the cam passes above it, lifts the rod $n$, which in turn lifts the gravity-catch from the nose of the cam $m$, allowing the spiral spring $l^2$ to push back the cam $m$ and the lever L, which has now completed its signal, to its normal position above the wheel J. At the same moment the arm $p^2$ of the lever N' falls into the recess $p'$ and arrests the motion of the alarm mechanism.

To prevent the overwinding of the coiled spring I and to keep it constantly at the proper tension for turning the signal-wheels at the requisite speed, notwithstanding the variations in the vertical lift of the rod B, I make use of the following arrangement: The sector $g'$ of the segmental lever F has nearly twice the number of teeth contained by the pinion G. It will also be noticed that the ratchet or cam H is only provided with one tooth, which comes in contact with the pawl $h$ only at the end of a complete revolution of cam H. Now, if the sector $g'$ be turned to its fullest extent, (for a "down-brakes" signal on the wheel J²,) the pinion G and cam H will nearly, but not quite, have made two revolutions and the spring I will have been wound up to the same extent. The cam H is now revolved by the spring I in the proper direction for turning the signal-wheels; but the tooth $h'$, not having been caught at its incompleted second revolution by the pawl $h$, the said signal-wheels remain stationary until the tooth $h'$, on beginning to retrace its first revolution, meets the pawl $h$ and carries it and the signal-wheels with it to the end of the revolution.

Should a locomotive from any cause whatever remain on the track in such a position that the rod B is kept elevated by an inclined plane, or if the rod is purposely lifted, as hereinafter described, by means of the hand-lever E', the alarm mechanism will quietly remain at rest until the locomotive moves from the spot or until the hand-lever is released, when the proper signal corresponding to the height to which the rod was lifted will be given.

To prevent the side or up-and-down motion of the locomotive when running from affecting the nature of or causing the wrong signals to be given, the inclined alarm-planes are made somewhat higher than would be just necessary if the locomotive were stationary, to throw the nose of the cam $m$ far enough to be retained by a tooth of the gravity-catch N, so that the nose of the cam $m$ will be moved a little farther along the catch N, but not far enough to fall into the next tooth, thus insuring the rendering of the proper signal.

It will be seen from the above that when the rod B is raised through the agency of an inclined plane or other elevation it does not give a signal, but merely increases the tension of the springs I and D, and it is not until the friction roller or wheel C has left the elevation that the signal-wheels begin to revolve and the signal is given. Consequently the signal mechanism is not subjected to shocks or concussions, and the signal-wheels can revolve with perfect regularity and are enabled to give perfect, uniform, and distinct signals, regardless of the speed of the train or the length of the alarm-planes.

As the duration of the signals given—or, in other words, the length of time occupied by the signal-wheels in making one revolution—can be varied by regulating the tension of the actuating-spring or the weight of the rod B, this fact can be used to advantage by making the period of revolution of the signal mechanism shorter in express and longer in freight engines. This can be done without changing the character of the signals, and will be a sure indication of the class of trains by which they are given.

All the working parts of the alarm mechanism being inclosed within its case A, the entrance of dirt and dust is prohibited.

To enable the engineer to blow the whistle W by hand as occasion may require, I attach a cord terminating in a knob or handle, $l^4$, to the outer extremity of the arm of the signal-lever L. This arrangement will allow the whistle to be blown without interfering with the signaling mechanism.

Instead of being connected to the lever of the locomotive-whistle, the arm of the signal-lever may be provided with a knob or hammer at its outer end, said hammer being adapted to strike a gong or bell secured, preferably, to the side of the case A. When this construction is used, I prefer that the hammer of the signal-lever strike the gong upon entering a notch or depression of the signal-wheels, the spaces between the strokes being determined by the length of the elevations.

I do not restrict myself to the mechanical opening and closing of the whistle-valve by the movement of the signal-lever L, or the mechanical ringing of a bell or gong by said lever, as the signal-wheels J, J', and J² may form part of an electric circuit in which an electro-magnet and a suitable electrical generator or battery is placed, the armature of said electro-magnet being attached to the whistle-operating lever $w$, while the circuit is completed by an insulated contact spring or brush, which takes the place of the signal-lever L and bears against the periphery of the signal-wheels, the electrical circuit being made and broken by the elevations and depressions on the signal-wheels.

Having thus fully described the alarm mechanism, I will next proceed to describe that for automatically stopping the train when the open draw-bridge or misplaced-switch alarm is disregarded by the engineer. The collar E on the vertical rod B has two cylindrical projections, $e\ e'$. These projections are adapted, when the rod B is raised to its highest point, or the height required to transfer the signal-lever L to the last signal-wheel, $J^2$, to come in contact with and lift the forked end $o'$ of a bell-crank lever, O, pivoted at $o^2$ to the side of a locomotive. (See Figs. 2 and 23.) To the other arm, $o^3$, of the lever O is pivoted one end of a rod, $q$, connecting at its opposite end with a crank, Q, which crank Q controls the supply of steam to the cylinders of the locomotive by means of a cock or valve in the steam-supply pipe, said valve or cock being preferably connected to the crank Q by a rod extending through an opening in the side of the fire-box of the locomotive, although any other method of connecting said valve or cock with the crank Q or rod $q$ will answer, according to the particular build or construction of the locomotive. Extending from the other side of the bell-crank lever $o$ is another rod, $q'$, which is pivoted to the wheel or lever $Q'$, leading to the air, vacuum, or other brakes on the locomotive. A spring, $o$, one end of which is fixed at $o^4$ to the side or other convenient point of the cab, holds the lever O against a stop, $o^5$, on the retaining-lever $O'$. This retaining-lever is slightly flexible and constantly bears against the upper arm of the bell-crank lever O, and it is secured at its lower end to the floor or side of the cab. Near the upper end of the lever $O'$ one or more retaining-teeth, $o^6$, are formed, which hold the arm of the bell-crank lever when it is raised by the collar E. A cushion or stop, $e^3$, also limits the downward motion of the rod B, which is held at such a distance above the rails that the wheel C will clear all frogs, switches, &c., that may be in the way and assists in arresting the progress of the signal-wheels.

From the above it will be seen that when the roller C ascends a "stop" or "down-brakes" plane or elevation, the rod B is lifted until the wiper-cam throws the signal-lever to the wheel $J^2$. While this is taking place the projections $e\ e'$ on the collar E lift the arm $o'$ of the lever O, whose other arm, $o^3$, moves the rods $q$ and $q'$, respectively, a sufficient distance to shut off the steam and apply the brakes. The rod B now makes its descent, and as it does so the signal-wheel $J^2$ gives the down-brakes signal on the whistle W. Meanwhile the arm $o'$ is being held in its elevated position by one of the teeth $o^6$ on the retaining-lever $O'$, springing under it, and in this manner keeps the steam shut off and the brakes on until the train comes to a full stop, when the engineer, by slightly pulling the handle at the upper end of lever $O'$, may release the lever O, which will then, owing to the spring $o$, resume its proper position and restore the crank Q and brake-wheel $Q'$ to their normal condition.

The extent to which the steam may be cut off and the brakes applied can be varied according to the locality or the degree of danger present by slightly changing the height of the down-brakes or stopping inclines, in order to throw the arm $o'$ into any desired tooth of the retaining-lever $O'$. The rods $q\ q'$ are so adjusted with reference to their respective valves and the bell-crank lever O and teeth $o^6$ that when the arm $o'$ is held by the lowest tooth the steam-opening only is partly closed. When the arm $o'$ is lifted high enough to be engaged by the second tooth, the supply of steam is further diminished and the brakes partially applied, while when the arm $o'$ is engaged by the third or uppermost tooth the admission of steam to the cylinders is completely cut off and the brakes fully applied.

In order to permit the signal mechanism to be thrown out of action by the engineer, if it be desired for any reason that the whistle should not blow at the usual points—as, for instance, in passing through villages at night when the inhabitants are asleep, &c.—I employ a hand-lever, $E'$, pivoted to the side of the cab, which may be operated by the engineer to elevate the rod B and its wheel or shoe C sufficiently to escape the road or highway crossing inclines or elevations. The lever $E'$ is retained in the position in which it is placed by the engineer by one of a series of trip-catches (not shown in the drawings) that are secured to the side of the cab, which catches are so arranged as to hold the lever $E'$ in such a manner that the wheel C will remain elevated out of contact with any desired number of crossing-inclines until released by the engineer. If, however, it should happen that while the roller C is so held out of contact with the crossing, station, or other fixed inclines, and the train should meet a misplaced-switch or down-brakes incline in its elevated or "danger" position, the rod B will be lifted an additional height, releasing the lever $E'$ from its trip-catch, and the rod B, being now free to descend, will revolve the signal-wheels and cause them to give a misplaced-switch or down-brakes signal, as the case may be, on the whistle, and, if the latter signal, will also at the same moment shut off the steam and apply the brakes.

I have until now confined my description to the alarm-signal and train-stopping mechanism carried on the locomotive, and will now describe the inclined planes, the switch and draw-bridge mechanism, and connections through which the alarm is operated.

Referring to the drawings, $s$, Figs. 7, 8, and 11, represent, respectively, a top, side, and sectional view of a fixed double inclined plane, such as are used for a crossing or station signal. In order to combine lightness with strength and rigidity, I prefer to make the cross-section of these planes in shape of an I, increasing in height as it nears the center and diminishing toward both ends. These planes, as well as the others about to be described, are inclined from both ends, where they are level with the upper surface of the rail, toward a point at or near the center, where they are highest, in order that the wheel or shoe C may readily ascend the planes, whether the locomotive is run forward or backward. The planes $s$ are firmly secured to the cross-ties at such a distance from the crossing or railway-station as to give ample warning to persons at such crossing or station of the approach of a train.

At T is shown a form of alarm-plane capable of being raised or lowered when the draw-bridge or switch is opened or closed. Its operation is clearly shown in Figs. 7 and 9. When depressed, its highest point is level with the surface of the rail, but when raised is seven inches, or, when this form is used for stopping the train, is nine inches, comparatively, above the surface of the rail. The cross section of this elevation is preferably in the form of a T, increasing in height toward the center, as shown in Fig. 12.

On the plane T are secured two pins, $t'\ t'$— one near each end—to which, respectively, one end of a weighted lever, T', is pivoted. The levers T' T' are in turn supported at or near their center on two pivots or shafts, $t^2\ t^2$, secured to a metal plate, $t^3$, that is attached to the ends of the cross-ties $r\ r'$. To this plate are also secured in a suitable position two projecting pins or stops, $t^4\ t^4$. These stops are intended to limit the motion of the levers T' T', and are so adjusted with reference to the form of the levers that they will come into alternative contact with both the upper and lower arms of said levers. When the plane T is elevated, its entire weight is supported by the shafts $t^2\ t^2$, and the stops $t^4\ t^4$ serve to brace it against the impact of the sliding rod B of a locomotive approaching in the direction of the arrow, while when the plane T is depressed part of its weight is supported by the stops $t^4\ t^4$, which also limit its descent. The heavy ends of levers T' T' nearly counterbalance the weight of the inclined plane T, and the form of said levers is such and their weight so disposed as to require but little additional power at the switch-lever $t^5$ to operate said plane.

The operation of the devices shown in Figs. 6 and 9 may be briefly described as follows: To the draw-bar of the switch-lever $t^5$ is secured a link, $t^6$, connected to one arm of a bell-crank lever, $t^7$, that is pivoted at one side of the track, and whose other arm is connected to one end of the inclined plane T by means of a wire rope or cable, $c$. To the opposite end of the plane T is secured another rope, $c$, that connects in a similar manner with a second or distant alarm-plane, if two be used, but in case of two not being used, then with a returning-bar, X, moving in guides $x'\ x'$, which bar may be surrounded by a spiral returning-spring, $x$, as in Fig. 6, or it may connect with the signal post X', Figs. 16 and 17, to be hereinafter described. When the switch-rails $r^2\ r^2$ are moved from the main line to the siding, the rope or cable $c$, through the agency of link $t^6$ and bell-crank lever $t^7$, is pulled toward the switch, raising the alarm-plane T and compressing the spring $x$. The alarm-plane T will remain elevated until the switch is moved back to the main line, whereupon the spring $x$ will be at liberty to expand and depress the plane T. In some instances I prefer to dispense with the spring $x$ and returning bar X for this form of alarm-planes, as the weighted arms of the levers T' T', if made as shown in Fig. 9, will, when the plane T is not held elevated by the switch, throw the center of gravity of said plane to one side of their pivots, after which the plane T will sink into its normal position, as indicated by the dotted lines, by virtue of its increased weight. I do not, however, confine myself to this mode of operating the alarm-plane, but prefer, especially when two or more inclines are used, to reverse the operation of the alarm-planes, as here described, in such a manner that the counterweighted levers T' T' or the spring $x$ will normally act to elevate the plane, instead of depressing it, and that the cable $c$ will hold the plane in a depressed position against the upward pressure of the weighted levers or spring when the switch-rails are at "safety," the planes being elevated by the said weighted levers or spring when the pressure or pull on the cable $c$ is relaxed by moving the switch-rails to "danger." By this construction, which may also be applied to the draw-bridge mechanism and inclines connected therewith, the alarm planes or inclines will be automatically elevated to give an alarm-signal on an approaching train in case of an accidental injury to the switch or draw-bridge mechanism or a break in the cable $c$.

Fig. 10 represents a form of alarm-plane which is used in connection with that just described when a series of two or more planes are used. In this form of signal-plane provision is made for expansion and contraction of the operating rope or cable, and, as this form of plane is principally intended for distant signals, the working parts are all inclosed in a narrow rectangular box or case, U, preferably of iron or other metal, to protect them from injury by dirt, snow, rain, &c. To the upper ends of two short links, $u'\ u'$, whose lower ends are pivoted to pins in the case U, are pivoted two weighted arms or levers, U' U', linked at the extremities of their longer arms to a common vertically-guided supporting-bar, $u^2$, extending through a rectangular opening in the top of the case U and terminating in a friction-roller, $u^3$. The shaft of this roller extends across the interior of the case U and travels in and is guided by two vertical grooves or guides, $u^9$, on opposite sides of said case when the supporting-bar is reciprocated. A cam or shoe, $U^2$, capable of moving longitudinally upon a rail or guide, $u$, having uprights or stops $u^8$ $u^8$ at its ends, has two or more horizontal steps, $u^4$ $u^5$, formed at different heights on its upper surface, said steps being connected by a gradual incline with each other. A wire rope, chain, or cable, $c$ $c$, entering at each end of the case U, is guided over grooved pulleys $c'$ $c'$ in the ends of said case and fastened to either end of the shoe $U^2$. When in its normal position, the shoe $U^2$ is drawn back, as shown, and the vertical support $U^2$, owing to the weight of the long arms of the levers being slightly in excess of that of their shorter arms, rests upon the lower step, $u^4$, of the said shoe, and the arms $U'$ $U'$ lie perfectly level upon the top of the case U. When, now, the cam or shoe $U^2$ is moved forward by the tension exercised on the rope or cable $c$ by the opening of a draw-bridge, which will shortly be described, the shoe or roller $u^3$ at the end of the vertical support $u^2$ will gradually rise upon the inclined face of the shoe $U^2$ until it rests upon the upper step, $u^5$, lifting the signal-arms $U'$ $U'$ with it, the links $u'$ $u'$ moving forward sufficiently to compensate for the difference in length of the signal-arms with respect to the case U when they are raised in the center, until all the parts are in the position shown by the dotted lines in Fig. 10, in which position the arms $U'$ $U'$ form a double inclined plane of the proper height to give a draw-bridge-alarm signal. When the shoe $U^2$, which is shown in this figure as moving upon rollers $u^6$, is moved backward by the returning-bar X, the arms $U'$ $U'$ and supporting-bar $u^2$ descend until the wheel or shoe $u^3$ again rests upon the lower step and all the parts resume their normal position.

Instead of using the compensating-links $u'$ $u'$, the arms $U'$ $U'$ may be supported or pivoted on shafts extending from side to side of the case U, said case or arms being provided with short slots, within which the shafts may slide.

The steps $u^4$ $u^5$, are made somewhat longer than necessary to support the arms $U'$ $U'$, in order to allow for changes in the length of rope $c$, due to expansion and contraction.

The case U is intended to be sunk into the road-bed alongside the track, so that its upper surface will be level with that of the rail.

To prevent the feet of road-employés and others from being accidentally caught in the space between the rail and alarm-plane, I place a filling of wood or other substance, $r^3$, within said space, so as to leave the upper surface of said filling flush with the upper surface of the track-rails, as shown in Figs. 12 and 13, or allow the top of the case U to extend on one side and cover said space. Fig. 14 is a detail section of the upper part of the case, showing the longitudinal slot $u^7$ and the cross-section of the longer arms, $U'$, and the position occupied by them when resting upon the curved top of the case U. The rope or cable $c$, running into the case U, is protected by a box or tube, $c^2$, as in Fig. 21, and, if desired, the whole length of said rope or cable, which is suitably supported at intervals upon friction-rollers $c^3$, may be so protected.

I shall next proceed to describe the devices connected to the draw-bridge by which the alarm-inclines, and consequently the signal and safety mechanism on the locomotive, are operated in case of danger from an open drawbridge. Although the devices here shown for this purpose are specifically described, in order to show their construction and operation when applied to this system, I desire it understood that in operating the alarm-signaling and train-stopping mechanism I do not limit myself to the particular form and arrangement of devices set forth, but may employ other constructions, which, while not departing from the nature or limits of this invention, are better adapted to the requirements and regulations of different roads, and to various other forms of danger which it may be desired to guard against.

Figs. 15 and 16 of the drawings represent the two terminals of a draw-bridge-alarm signal-system, the alarm planes or elevations being interposed between the broken ends of the wire rope or cable $c$ $c$.

Figs. 18 and 19 represent diagrams, respectively, of the under side of a draw-bridge when closed and open.

Fig. 15 is a side view of the apparatus attached to the bridge for operating the wire rope or cable which leads to the alarm-planes. A draw-bar, V, moving in guides $v'$ $v'$, secured to the bottom of bridge $V'$, is provided at its outer end with a friction-roller, $v^3$, and near its inner end, to which one end of the cable $c$ is fastened, with a shoulder, $v^4$. To a projection on the draw-bar V is secured one end of a chain, $v^6$, which, after passing over a pulley, $v^2$, at the lower end of the guide $v'$, supports a weight, $v$, at its other end. The draw $V^2$ of the bridge is provided with a double inclined guide, $V^3$, against which the draw-bar roller $v^3$ is held by the weight $v$.

Figure 6:
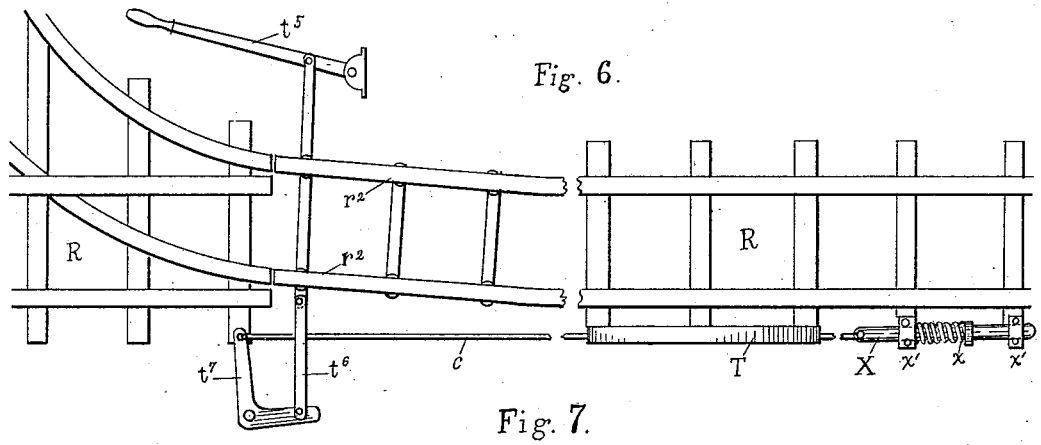
Figure 7:
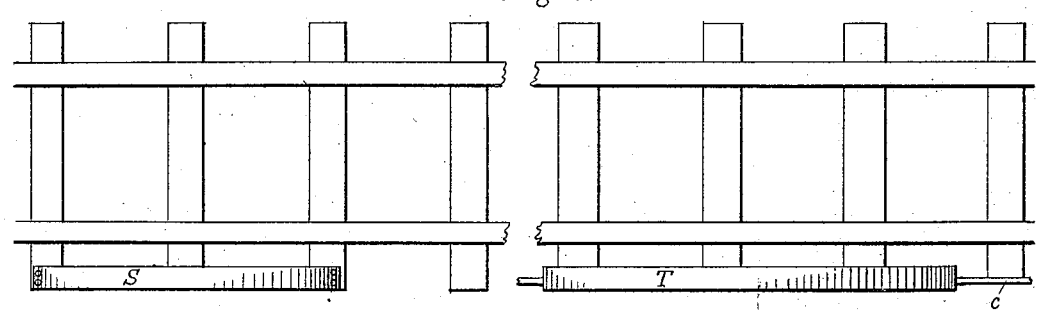
Figures 8, 9:
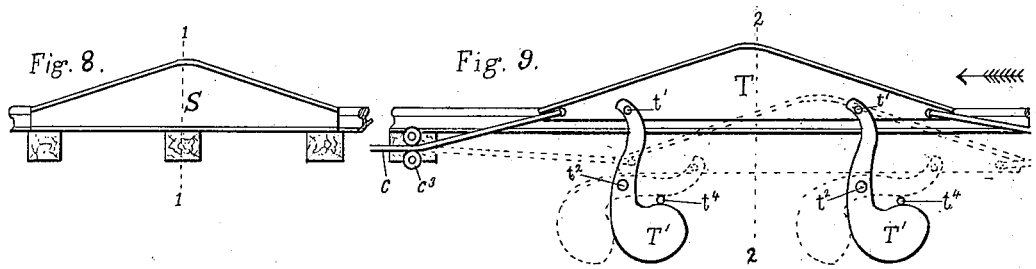
Figure 10:
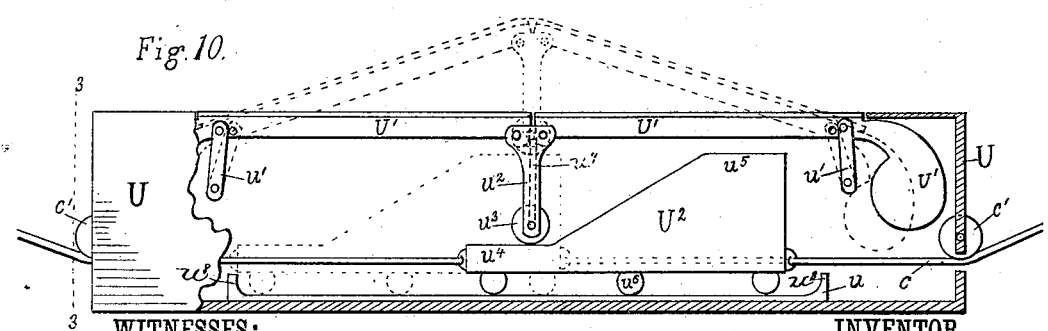
Figure 22:
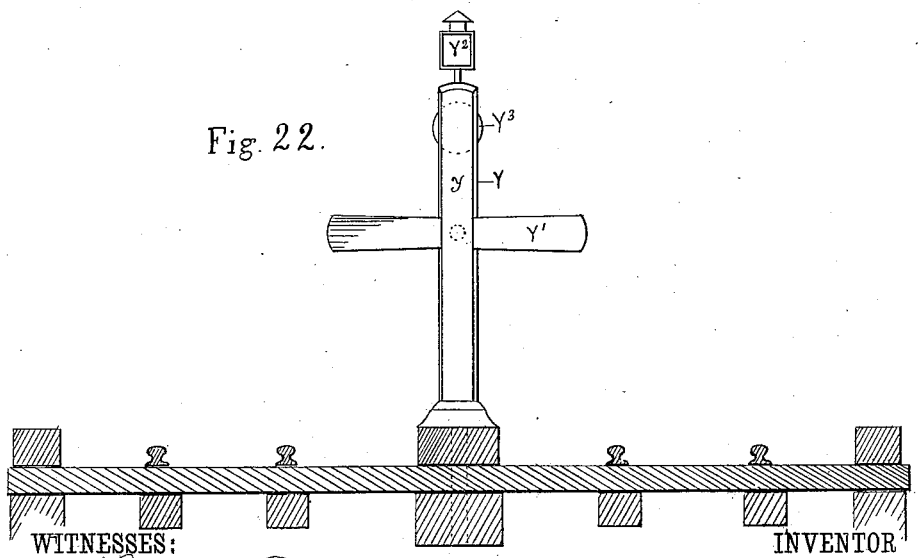
Figure 23:
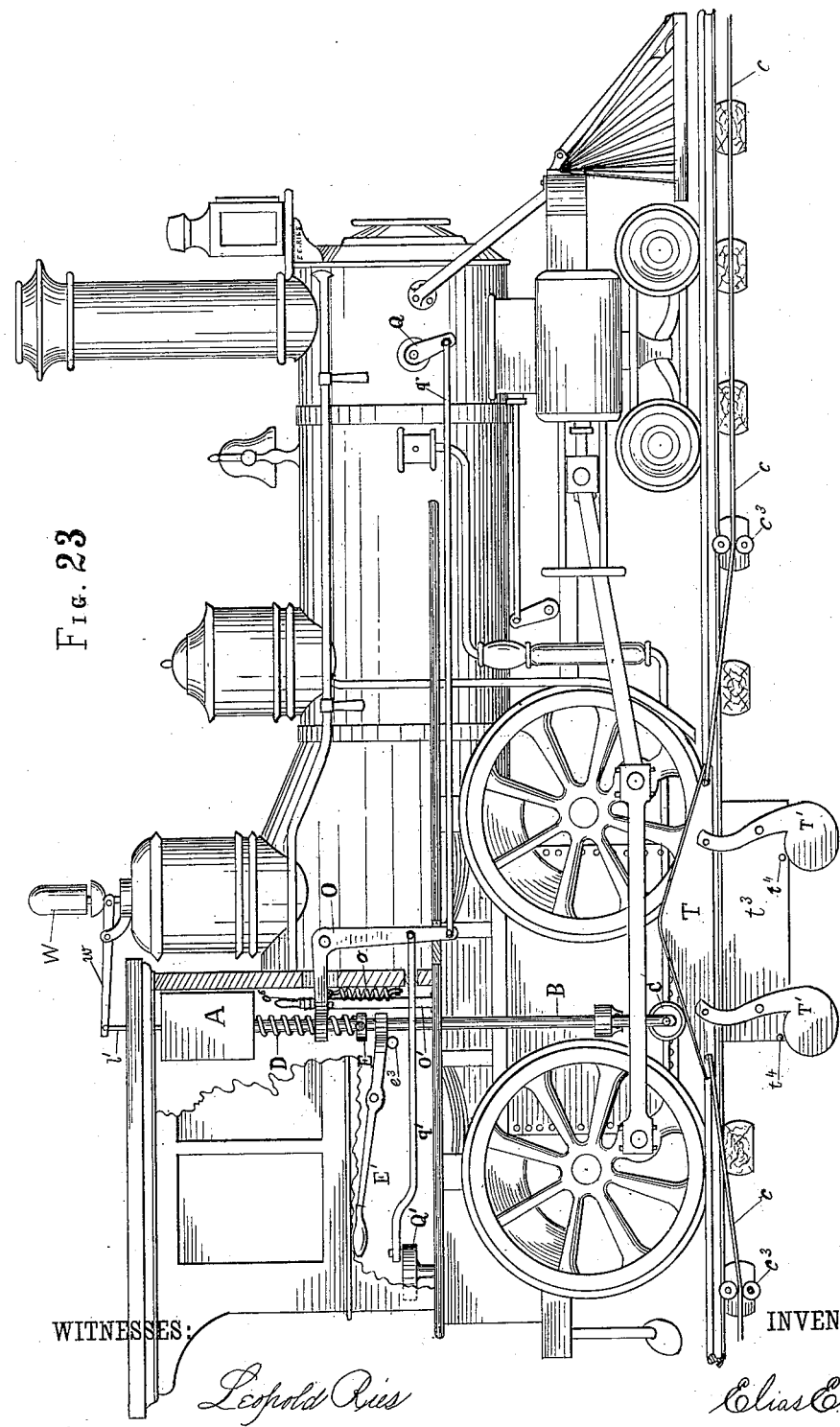

Fig. 16 represents an apparatus which is used at the distant end of the cable $c$ of a drawbridge or switch-signal system for returning or depressing the alarm-elevations to their normal position, and differs from that shown in Figs. 6 and 22 in that a weight, instead of a spring, is used, said weight at the same time displaying a visible signal to indicate the condition of the switch or draw-bridge. A draw-bar, X, moving in guides $x'$ $x'$, placed alongside of the track at the end of the series of alarm planes or elevations, and connected with said elevations by the cable $c$ at one of its ends, has a chain, $X^2$, secured to its other end, which chain passes under a guide-wheel, $x^3$, at the foot of a hollow post, $X'$, placed at one side of the railway-track. This chain is secured to a small chain-wheel, $x^4$, that is keyed to a horizontal shaft, $x^5$, running through the post $X'$ near its upper end. On the same shaft is keyed a large sector, $x^6$, to which one end of a second chain, $x^2$, is fastened. This chain is passed around the arc of the sector in an opposite direction to the chain $X^2$, and supports a weight, $X^3$, at its lower extremity. One end of the shaft $x^5$ extends through the side of the post $X'$ and supports a visible signal, $X^4$, that is normally concealed behind the screen $x^7$.

The operation of the devices just described is as follows: When the draw $V^2$ opens and the inclined guide $V^3$ passes in front of the roller $v^3$, the draw-bar V, with the cable $c$, is gradually drawn out under the influence of the weighted box $v$ until its further movement is arrested by the shoulder $v^4$ coming against the guide $v'$. At the same time the series of alarm-planes are being raised and the returning-bar X drawn out with its chain $X^2$, said chain turning the shaft $x^5$ one-fourth of a revolution, causing the visible-signal arm $X^4$ to project at right angles to the post $X'$, as in Fig. 17. The sector $x^6$, being likewise turned one-fourth, (in such a manner that its arc is turned from the side to the top of the shaft,) lifts the weight $X^3$. The parts are held in this position by the weight $v$. Now, when the draw-bridge closes, the inclined guide $V^3$ again comes in contact with the wheel or shoe $v^3$ of the draw-bar V, causing said wheel to ride upon its inclined surface as the draw closes, thus forcing the draw-bar V backward and lifting the weight $v$. The cable $c$, being relieved from the tension of the draw-bridge-weight $v$ on one side, is now acted upon by the returning weight $X^3$ in the post $X'$, which descends, winds up the chain $X^2$, draws back the returning draw-bar X, and depresses the alarm-elevations, to which it is connected by the cable $c$, and at the same time allows the visible signal $X^4$ to sink behind the screen $x^7$.

In addition to the alarm-planes and distant signal, before described, I make use of a home signal, situated at the entrance to or immediately in front of the draw of the bridge. This signal is operated by the same mechanism before described, and gives notice both by visible and audible signals of the state of the draw $V^2$.

Figure 21:
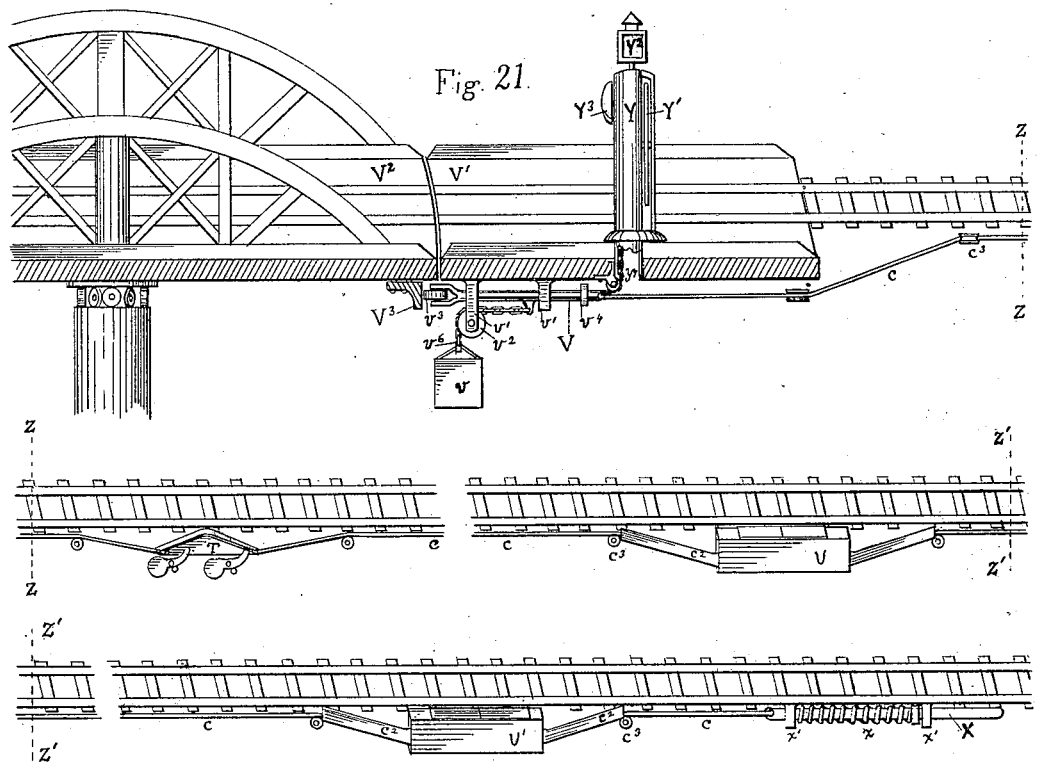
Fig. 21 is a general view, in three parts, of a draw-bridge and the system of alarm-planes connected therewith.

By referring to Figs. 20, 21, and 22, Y will be seen to represent a tubular signal-post, preferably of cast-iron, having a screen, $y$, formed on one of its sides, between which and the post a signal-arm, Y', is free to turn. This signal-arm may be made of wood or light metal, and is fixed to the end of a shaft, $y'$, running through the upper portion of the post Y. To the shaft $y'$ are firmly secured a chain-wheel, $y^2$, having pins $y^3$ in its circumference, said pins being adapted to engage with the end of a spring bell-hammer, $y^4$, one end of which extends through the wall of the post Y and is adapted to strike a gong or bell, $Y^3$, secured to the side of said post, and a bevel gear-wheel, $y^5$, the latter meshing with a similar wheel fixed to the lower end of a vertical shaft, $y^6$, extending through the top of the signal-post, said vertical post bearing a signal-lamp, $Y^2$, at its upper end. A chain, $y^7$, having a spring or weight, $Y^4$, at one end, is passed around the chain-wheel $y^2$ and its other end secured to the draw-bar V, attached to the draw-bridge V'. When the draw-bar V is drawn outward by the opening of the draw, the chain $y^7$ turns its wheel or sector $y^2$ until it has made one-fourth of a revolution. Meanwhile the pins $y^3$ on the wheel or sector $y^2$ engage with the end of the bell-hammer $y^4$, causing it to strike a succession of blows upon the gong $Y^3$. At the same time the signal-lamp $Y^2$ is turned one-fourth of a revolution, and the signal-arm Y' is turned from a vertical to a horizontal position, as shown in Fig. 22, in which position they will remain until the draw-bridge closes, whereupon the weight $Y^4$ returns the lamp $Y^2$ and signal Y' to their original or "safety" position, ringing the gong $Y^3$ as it does so to notify a waiting train by an audible signal that the track is clear.

By referring to Fig. 21, which gives a general view of the draw-bridge system in its normal or "safety" position, it will be seen that the weight $v$ operates, through the medium of the wire rope or cable $c$, first, the home signal Y, placed at or near the draw-bridge; second, the train-stopping-alarm plane T, which is of the proper height to operate the train-stopping mechanism on the locomotive, and is placed at a sufficient distance from the draw to allow the train to come to a full stop when acted upon by said plane before reaching the home signal Y; third, the intermediate alarm-plane, U, which is somewhat lower when elevated than the train-stopping or down-brakes alarm-plane, and is situated two hundred yards (more or less) from the plane T; fourth, the distant alarm-plane U', which is of the same height as the intermediate plane, and, like it, causes an open-draw-bridge signal to be given on the whistle of an approaching train; and, fifth, the returning-spring, or in lieu thereof the distant signal and returning-weight, $X^4$ and $X^3$. The returning-weight $X^3$ exerts a sufficient pull upon the draw-bar X and cable $c$ to easily draw back the shoes $U^2$ of the alarm-planes U and U' and overcome the friction of the cable, which may be of comparatively small diameter. The draw-bridge weight $v$ is heavy enough to overcome the friction of the cable $c$, elevate the alarm-planes, and wind up or lift the returning-weight $X^3$ at the end of the series of planes. By the use of these two opposing weights the cable $c$ is constantly held taut, and any ordinary changes in its length due to difference in temperature are amply compensated for by the construction of the alarm-planes U.

The operation of the system of draw-bridge signals just described is as follows: When a locomotive approaches an open draw-bridge, it first comes to the distant alarm-plane U', which gives a draw-bridge alarm upon the whistle of said locomotive, and is a signal to the engineer to continue at slower speed to the next plane. Should the draw be closed in the interval, the second plane, U, will give no signal, and the engineer will continue his way unobstructed across the bridge. Should the draw, however, be still open, the said plane will repeat the alarm on the whistle, upon which the engineer will come to a full stop before reaching the down-brakes plane T, within hearing and in view of the gong $Y^3$ and the home signal Y. The train will remain here until the bridge closes, whereupon the alarm-planes descend, the signal-arm Y' and lamp $Y^2$ return to the "safety" point, and the gong $Y^3$ rings to call the engineer's attention to the fact that the track is clear, and that he may proceed.

Should the engineer from any cause fail to obey the warning signals of his whistle and continue past the intermediate plane, U, without stopping, when the bridge is open, the train will be automatically stopped upon reaching the alarm-plane T, which, in the manner hereinbefore described, shuts off the steam, puts on the brakes, and gives a down-brakes or other signal on the whistle W of the locomotive.

In some cases it may be desirable to diminish the speed of the train in cases of danger, instead of stopping it, or to first diminish the speed and then stopping its motion after having proceeded a certain distance—as, for instance, where the form of danger present merely requires extra caution, or where real danger exists, which may at any moment return to "safety" before the train arrives within dangerous proximity thereto, as in the case of the open-draw-bridge system above described, in which, by making the intermediate incline somewhat higher than the distant, but not as high as the train-stopping incline, the train stopping mechanism will be operated in the manner hereinbefore described to automatically diminish the speed of the train. While the train is proceeding at the slower speed between the intermediate and the train-stopping incline, the engineer is kept informed by the home signal Y whether or not it is safe for him to continue. If the draw closes before the train arrives at the train-stopping incline, the signal-post Y will so notify him, and he may increase speed. If, however, the draw is yet open, he is required to stop his train, which, in case of neglect or disability on his part, is done automatically by the train-stopping incline, which in addition gives a down-brakes, signal to inform the conductor and brakemen of the occurrence. By this method the strain and wear incident to a sudden stoppage of a train in full motion is greatly decreased, and the speed of the train, being already diminished, a complete stop can be made (if it is found necessary to stop) in a shorter space of time, and consequently the train-stopping incline can be placed nearer the draw or other point of danger.

Having thus fully described my invention, what I claim is—

1. The within-described system of automatic alarm-signals and safety devices for railway-trains, consisting of a series of fixed and movable inclines or elevations of different relative heights placed at different points alongside of a railway-track, a signal mechanism carried on a locomotive or train, capable of being operated by said elevations to give audible signals differing in their form and nature according to the height of the inclines causing them, a train-stopping mechanism, also carried on the locomotive, adapted to be operated by the highest of the inclines or elevations to control the movement of or stop a train in case of danger from an open draw-bridge or other source, actuating mechanism connected to a draw-bridge or switch, and designed and adapted to automatically elevate the aforesaid movable inclines or elevations connected therewith when the draw-bridge or switch is opened or moved, and one or more visual signals, substantially as described, operated by said actuating mechanism, for the purpose set forth.

2. An audible-signal mechanism for railroad-trains, carried on a locomotive or train, in combination with a series of inclines or elevations of different heights placed alongside of a railway-track, said mechanism being complete in itself to give or produce directly a number of definite audible signals varying from one another in their specific form and nature, and being set for the purpose by said inclines or elevations, said signals being regularly and uniformly given in a predetermined space of time, regardless and independent of the speed of the train, substantially as set forth.

3. In a railroad-signal system, a signal mechanism containing a number of signal-wheels carried on a locomotive, combined with mechanism placed along the railway for causing said signal-wheels to give a number of audible signals of different specific form upon a whistle or bell on said locomotive.

4. In a railroad-signal system, a signaling apparatus containing a number of signal-wheels designed and adapted to give or produce, respectively, a "crossing," "station," "misplaced-switch," "open draw-bridge," and "down-brakes" signal on the whistle of a locomotive, combined with devices placed at or near such crossing, station, switch, and draw-bridge, and adapted to operate said signaling device for the purpose of giving or producing such signals.

5. In an audible railway-signal system, a signaling apparatus designed and adapted to give audible signals of definite predetermined form upon a moving locomotive or train, said signaling apparatus being provided with a governing or timing device, whereby the length or duration of the resulting signals may be controlled or regulated.

6. In a railway-signal system, the combination, with inclines or elevations adjacent to the track-rails, of a signaling apparatus designed and adapted to be operated by said inclines to give a series of audible signals, each signal consisting of a succession of long or short blasts, or a combination of both, upon the whistle of a locomotive, and a regulating or timing device for controlling the operation of the signaling apparatus and cause it to give its signals in a uniform manner and within a predetermined interval of time, for the purpose set forth.

7. An audible signaling apparatus for railroad-trains, carried on a locomotive or train, said apparatus having one or more signal-wheels, and mechanism adapted to revolve said wheel or wheels and cause them to produce audible signals upon a whistle or bell on said locomotive or train, said apparatus being also provided with a suitable regulating device for regulating and controlling the motion of the signal-wheels, and thereby enable them to produce uniform and regular signals, as set forth.

8. In an audible signaling or alarm device for railroad-trains, the combination of a vertically-guided rod or bar terminating in a shoe or wheel adapted to ride upon inclines or elevations alongside or adjacent to a railway-track, an actuating-spring (or its equivalent weight) adapted to be compressed or wound by the said rod when it is elevated by one of the inclines or elevations, and a suitable signaling mechanism capable of giving a number of dissimilar arbitrary signals, and designed and adapted to be set in motion and operated by said spring or weight to give one or more of such signals when the wheel or shoe has left the incline or elevation, substantially as and for the purpose set forth.

9. In an audible signaling or alarm device for railway-trains, the combination, with inclines or elevations alongside of or adjacent to the track-rails, of a vertically-guided rod or bar attached to a locomotive or train and adapted to be elevated by said inclines to different heights, and a signal mechanism operated by the descent of said bar to give one of a code of arbitrary signals upon a whistle or bell on said locomotive or train.

10. In an audible signaling or alarm device for railroad-trains, the combination, with inclines or elevations along the track, of a vertically-guided rod terminating at its lower end in a shoe or wheel adapted to ride upon said elevations, a suitable mechanism for imparting or utilizing the upward motion of the rod to wind or increase the tension of a coiled spring, one or more signal-wheels adapted to be set in motion by the said spring, a signal-lever for operating the steam-whistle of, or a bell or gong on, a locomotive, and means for automatically changing the form of signal given by the signaling or alarm device, substantially as and for the purpose set forth.

11. In an audible signaling or alarm device for railroad-trains, the combination, with elevations or inclines placed along a railway-track, and a spring-pressed or weighted rod or bar on a locomotive, adapted to be raised vertically by said elevations or inclines, of a retaining hand-lever, E', to enable the engineer or driver to lift the said rod or bar above said elevations when it is not desired that an alarm should be given, substantially as set forth.

12. In an audible signaling or alarm device, a series of signal-wheels having elevations and depressions in their periphery, means for revolving said wheels, and means whereby when the wheels are revolved arbitrary signals can be given upon a whistle, bell, or other sonorous body.

13. In an audible signaling or alarm device, a series of signal-wheels having elevations and depressions in their periphery, means, substantially as set forth, for revolving said wheels, and mechanism for automatically locking or arresting the motion of the signal-wheels when they have completed one revolution, for the purpose set forth.

14. An audible signaling or alarm device having a series of two or more signal-wheels provided with elevations and depressions in their periphery, a suitable signal lever or brush capable of being automatically transferred or moved to the proper signal-wheel for giving any desired signal, and means, substantially as described, whereby the signal lever or brush is enabled, when the signal-wheels are revolved, to give a series of signals, corresponding to the elevations and depressions on the signal-wheels, upon a whistle, bell, or gong, substantially as specified.

15. The combination, with an audible signaling or alarm device having one or more signal-wheels, and suitable spring-impelled mechanism for operating said wheel or wheels to give a signal upon a whistle, bell, or other sonorous body on a locomotive, of one or more inclines or elevations placed along the roadway to wind said spring by elevating a depending mechanism carried by the locomotive, substantially as and for the purpose described.

16. The combination, with an audible signaling or alarm device having one or more signal-wheels, and a signal-lever operated by the said wheel or wheels to give one or more signals on a steam-whistle or other sounding body when the said wheel or wheels revolve, of the rope or rod $l'$, attached to said signal-lever, and the knob $l^1$ at the extremity of said rope, whereby the whistle or other body can be sounded by hand when desired without interfering with or disturbing the signaling apparatus, as set forth.

17. In an audible signaling or alarm device for railroad-trains, the combination, with inclines or elevations along a railway-track, and a sliding bar or rod terminating in a friction roller or shoe at its lower end, carried on a locomotive and adapted to be raised vertically, of a rack or teeth, b, and a lever, F, having a toothed segment or sector at either end, substantially as and for the purpose described.

18. The combination, with inclines or elevations along a railway-line, a sliding bar carried on a locomotive, and a lever provided with a toothed sector at either end, of a gear or pinion, G, adapted to be revolved by one of the sectors of said lever when its other sector is engaged by said sliding bar, and a coiled spring, I, adapted to be wound when the pinion G is revolved, substantially as and for the purpose described.

19. In an alarm or signaling device, the combination, with the shaft $g$, pinion G, and an actuating spring or weight, of a ratchet or cam, H, having a single tooth or depression, $h'$, and a pawl, $h$, adapted to come in contact with said tooth or depression when the shaft $g$ has made a complete revolution, substantially as described.

20. In an alarm or signaling device, the combination of a sliding lever and two or more signal-wheels provided with a common notch or opening in their periphery, across which the lever may slide.

21. The signal-wheels J J' J$^2$, provided with elevations and depressions in their periphery, and having a notch, $l^3$, extending across the face of said wheels, in combination with a signal-lever adapted to be moved along the line of said notch to either of said wheels, substantially as and for the purpose set forth.

22. The signal-wheels J J' J$^2$, turning loosely upon the shaft $g$, and having a common notch, $l^3$, at a suitable point in their periphery, a spring-pressed signal-lever capable of being moved back and forth in line with said notches, means for transferring or moving the signal-lever to the desired signal-wheel, and means for retaining said lever in position over such signal-wheel until said wheel has completed its signal, substantially as and for the purpose specified.

23. In an alarm or signaling mechanism, the combination, with the spring I and the signal-wheels J J' J$^2$, of the regulating mechanism, consisting of the fly or fan K, driving-gear $k$, intermediate gearing, $k'$, $k^2$, and $k^3$, and the sleeve $f^2$, to enable the gears $k'$ and $k^2$ to revolve on shaft $f$ independently of the motion of said shaft, substantially as specified.

24. The combination, with the signal-wheels, of the sliding signal-lever L, having one end of its hub tapered, substantially as and for the purpose set forth.

25. The combination, with the lever $w$ of a steam or other whistle, of one or more revolving signal-wheels having elevations and depressions in their periphery, a signal-lever held in contact with one of said signal-wheels and adapted to rise and fall as the elevations and depressions of the signal-wheels pass under it, and a rod or cord connecting said signal-lever with the whistle-lever, for the purpose of imparting to the latter the motion given to the signal-lever by the elevations and depressions of the signal wheel or wheels.

26. The combination, with the signal-wheels and the signal-lever, of a cam for moving said lever to the proper signal-wheel for giving a desired signal, and a spiral spring for returning the signal-lever and cam to their normal position after the signal has been given, substantially as set forth.

27. In an alarm or signaling mechanism for producing audible signals, the combination, with the signal-wheels, the movable signal-lever, and the spiral spring bearing against said lever, of a cam to transfer the signal-lever along the signal-wheels, and a gravity retaining-catch having teeth corresponding to the number of signal-wheels, and adapted to engage with and hold the nose of the transferring-cam, substantially as and for the purpose set forth.

28. The combination, with the signal-wheels, the movable signal-lever, the spiral spring bearing against said lever, the transferring-cam, and the gravity-catch, of the releasing-cam P, the lever N', having a hook, $p^2$, capable of rising upon the releasing-cam, and a rod, $n$, connecting the lever N' with the gravity-catch and adapted to be raised by the cam P at every revolution of the signal-wheels to release the transferring-cam $m$ by lifting the gravity-catch, substantially as and for the purpose set forth.

29. In combination with the signal-wheels and regulating-gearing, the lever N', having a hook, $p^2$, adapted to fall into a notch or recess formed in or placed on the side of one of the signal-wheels, to arrest the progress of said wheels at the end of each revolution, substantially as described.

30. The combination, with the lever N', having a hook, $p^2$, and an arm, $p^4$, and the hook $p$ and recess $p'$, of the trip-lever and the pin or stud $p^5$, to release the signal-wheels from the retaining-hook $p^2$, as set forth.

31. The combination, with the signal-wheels and their operating mechanism, of the cam P, lever N', rod $n$, and gravity-catch N, substantially as and for the purpose described.

32. In an alarm or signaling device for producing audible signals, the combination, with the sliding bar or rod, spring I, pinion G, toothed cam H, and pawl $h$, of a double segmental toothed lever, F, having a small sector, $b'$, to engage with a rack or teeth on the sliding bar, and a large sector, $g'$, for turning the pinion G, said large sector being provided with twice the number of teeth contained by the pinion, substantially as and for the purpose set forth.

33. In an alarm or signaling device, the combination, with the rock-shaft, of the gravity-catch, the transferring-cam, and a projecting arm on said rock-shaft, by means of which the transferring-cam is moved to any desired tooth of the gravity-catch, substantially as shown, and for the purpose specified.

34. The combination, with the gravity-catch, the transferring-cam, the rock-shaft, and the projecting arm on said rock-shaft, of an arm or guide attached to the sliding bar or rack, said arm or guide being adapted to engage with and move the rock-shaft arm to varying distances when the bar or rack is moved beyond a certain point, substantially as and for the purpose set forth.

35. The combination, with the signal-wheels and signal-lever, of the rock-shaft and transferring-cam for moving said lever, and the gravity-catch for holding said lever to the desired signal-wheel, substantially as and for the purpose set forth.

36. In an alarm or signaling device, the combination, with the signal-wheels and signal-lever, and a sliding bar or rack, and suitable mechanism for operating said wheels, of a rock-shaft having a cam for moving said lever, and a projecting arm adapted to be moved by an arm or guide attached to the sliding bar when the latter is lifted beyond a certain height, for the purpose set forth.

37. The sliding bar or rod B, provided at one end with a rack or teeth, in combination with the signal-wheels and their driving and regulating mechanism, substantially as and for the purpose described.

38. In an audible signaling or alarm device for railway-trains, the combination, with inclines or elevations alongside of a railway-track, of a sliding bar or rod guided in bearings on a locomotive and terminating in a shoe or wheel adapted to ascend the inclines or elevations, a signaling mechanism containing one or more signal-wheels, also carried on the locomotive, and designed to be operated by the said bar, to produce a signal while the bar is descending after having been elevated by one of the inclines, and a spiral spring bearing downwardly against a collar on said bar, substantially as and for purposes set forth.

39. The combination, with elevations or inclines arranged alongside of a railway-track, of a vertically-guided rod terminating in a shoe or wheel supported in bearings on a locomotive and adapted to be raised or reciprocated to different heights by said inclines or elevations, a signaling mechanism capable of giving a number of definite audible signals differing from each other in nature and import, carried on the locomotive and adapted to be operated by the said rod to give any desired signal, a train-stopping mechanism, also carried by the said locomotive, and a suitable collar or projection on said rod designed and adapted to come in contact with and operate the train-stopping mechanism, to automatically stop the train when the rod is lifted the proper height to cause the signaling mechanism to give a down-brakes signal, as set forth.

40. The combination, with a vertically-guided bar designed and adapted to be raised to various heights by a series of inclines, elevations, or signal-arms placed at various points along a railway-track, and a revolving signal mechanism operated by said bar to give audible signals upon a locomotive or train, of a lever mechanism connected with and controlling the steam-supply pipe and the air, vacuum, or other brakes of the locomotive or train, and adapted to be operated by said bar when it is lifted to its highest point, for the purpose of controlling the speed of or stopping a railroad-train, substantially as specified.

41. The combination, with the steam-supply pipe and the air, vacuum, or other brakes of a locomotive or train, of a sliding bar or rod attached to said locomotive and adapted to be moved or reciprocated within certain limits by a series of fixed and movable inclines or guides placed alongside of and adjacent to the track-rails for the purpose of causing audible signals or alarms to be given by a signal mechanism carried by the locomotive, said signals varying in form and nature according to the extent or limit to which the said bar or rod is moved by said inclines, and a lever mechanism connected with said steam-pipe and brakes and normally held out of action while the rod or bar is being reciprocated within the ordinary limits, for giving one or more audible signals, but which is automatically operated by the said bar or rod to close or cut off the steam-supply and apply the brakes when the said bar or rod is moved to its fullest extent, substantially as set forth.

42. In a train-stopping and alarm device for railway-trains, the combination, with the steam-supply pipe and brakes, of a sliding bar or rod attached to the locomotive or train and adapted to be moved or reciprocated within certain limits by a series of inclines or guides of different heights placed alongside of or adjacent to the track-rails, a signal mechanism, also carried by said locomotive or train, and designed and adapted to be operated by the said bar or rod, to cause or produce audible signals of various forms on a whistle, bell, or other sounding body on said locomotive or train, said signals varying in form and nature according to the extent or limit to which the said bar or rod is moved by said inclines, and a suitable mechanism or apparatus connected with the steam-pipe and brakes of said train, and designed and arranged to be operated by the said bar or rod when a stop or "danger" signal is given by the signal mechanism, or under conditions of extreme or impending danger, to control and regulate the admission of steam to the locomotive-cylinders, and the application of the brakes, but which is not designed to be operated when the bar or rod is moved to cause ordinary warning or cautionary signals to be given by said signaling mechanism, as set forth.

43. The combination, with the steam-supply pipe, and the air, vacuum, or other brakes of a locomotive, of a bell-crank lever, O, having rods $q\ q'$, connecting with cranks or levers Q Q', controlling, respectively, the supply of steam to the cylinders and the application of the brakes, said lever being operated by a collar or projection on a sliding bar or rod moving in bearings on said locomotive when said bar or rod is elevated the proper height by an incline or elevation alongside of the railway-track, as and for the purpose set forth.

44. The combination, with the bell-crank lever and intermediate lever mechanism for shutting off the supply of steam and applying the brakes, of a retaining-lever having one or more teeth or notches to retain the arm of the bell-crank lever when said arm is lifted, and thereby keep the supply of steam entirely or partially shut off and the brakes fully or partially on until released by the engineer, substantially as set forth.

45. The combination, with the bell-crank lever O, the retaining-lever O', and the intermediate lever mechanism connected with the steam-supply valve and the brakes of a locomotive, of the spring $o$, for returning the bell-crank lever and the lever mechanism connected therewith to its normal position when the bell-crank lever is released from the teeth of the lever O', substantially as shown.

46. The double inclined plane $s$, of iron or other metal, having its cross-section in shape of an I, increasing in height as it approaches the center of the incline, said inclined plane being secured to the road-bed at one side of a railway-track at a distance from a road crossing or station, in combination with a signaling device having one or more signal-wheels carried on a moving locomotive or train, and designed and adapted to be operated by said inclined plane to give a crossing or station signal upon a steam or other whistle on said locomotive or train, for the purpose set forth.

47. In a railroad-signal and safety system, the combination, with a railroad-track and a depending mechanism carried by a moving locomotive or train, of a series of fixed alarm inclines or elevations permanently placed at different points of said track and adapted to come in contact with and operate the depending mechanism each time it passes said inclines, and a second series of pivoted or movable inclines, also placed along the line of said track, for the purpose of operating said depending mechanism, but only adapted and designed to come into operative contact with said mechanism at certain times and under certain conditions, substantially in the manner set forth.

48. The combination, with a railroad-track and a sliding bar terminating in a shoe or wheel carried on a moving locomotive or train, of a series of fixed and movable inclines or elevations placed adjacent to the track-rails and at different points along the line of said track, said inclines being of different relative heights with respect to each other, and designed and adapted to come into successive operative contact with the said sliding bar at the proper time for the purpose of enabling it to produce a succession of predetermined audible signals of different specific forms, and perform other operations, each resulting signal or operation being dependent upon and determined by the proportionate height of the particular incline or elevation by which it is caused, substantially as set forth.

49. A movable incline or elevation for giving automatic signals upon a moving locomotive or train, consisting of the incline T, formed substantially as shown, and having weighted levers T' T' at either end, said levers being pivoted to a frame or plate secured to the cross-ties or road-bed of a railway-track, and stops $t^4\ t^4$, for limiting the motion of the levers and the incline or elevation, substantially as set forth.

50. The combination, with the plate $t^3$, secured at one side of a railway-track, the alarm-incline T, and a rope or cable, $c$, secured to the alarm-incline for operating it, of the weighted levers T' T', formed, substantially as shown, to counterbalance the alarm-incline and aid in returning it to its normal position, and the stops $t^4\ t^4$, to limit their motion, substantially as and for the purpose specified.

51. The combination, with one or more movable inclines or elevations arranged alongside of a railway-track and designed and adapted to operate depending mechanism, substantially as described, on a moving locomotive or train, of the returning-bar X and the spring $x$, moving in guides $x'\ x'$, substantially as and for the purpose set forth.

52. In combination with a railway-track, the case U, embedded in the road-bed parallel with said track, and having signal-arms U' U', designed and adapted to form a double incline when raised at their longer extremities, substantially as and for the purpose described.

53. The combination, with the case U, the weighted signal-arms, and the vertically-guided support secured to said arms, of the compensating-links $u'\ u'$, as and for the purpose set forth.

54. The combination, with the weighted arms and their operating mechanism, of the metallic protecting-case having a longitudinal slot or opening in its top, which opening is normally covered by the weighted arms, substantially as shown, and for the purpose set forth.

55. The combination, with the protecting-case, the weighted signal-arms, the compensating-links, and the vertical support terminating in a shoe or friction-wheel, of a shoe or cam having two or more horizontal steps or rests at different heights, said steps being connected by one or more inclines, and designed to act as a support for holding the signal-arms firmly against downward pressure when said arms are either elevated or depressed, substantially as shown.

56. The combination, with the protecting-case, the signal-arms, the compensating-links, the supporting-bar, and the shoe or cam, of a wire rope, chain, or cable, secured to either end of said shoe or cam, and friction-pulleys secured at or near the ends of the case, for supporting or guiding said rope, chain, or cable, substantially as and for the purpose specified.

57. The combination, with the case, the signal-arms, the supporting-bar, and the rope or cable, of the shoe having horizontal steps at different heights, as described, said steps being of sufficient length to compensate for expansion and contraction of the rope or cable, and of a longitudinal guide, rail, or plate having stops at its extremities, upon which the shoe may move, substantially as described.

58. The combination, with a fixed or movable projection or elevation placed at the side of a railway-track, designed to operate or give an audible signal upon a locomotive or train, of a filling of wood or other suitable substance between said elevation and one of the track-rails, said filling having its upper surface level with the upper surface of said track-rail, substantially as and for the purpose set forth.

59. The combination, with an operating bar or lever, in connection with a railway-switch or draw-bridge, of two or more movable inclines, elevations, or signal-arms capable of being raised to different relative heights for operating a suitable mechanism on a moving locomotive or train, to give audible signals or perform other operations corresponding to or depending upon such various heights, a rope or cable connecting said inclines, elevations, or signal-arms with each other and with the operating bar or lever of the switch or draw-bridge, and a suitable compensating device for enabling said operating mechanism to move said inclines, elevations, or signal-arms to their respective positions without regard to the expansion and contraction of said rope or cable, as and for the purpose set forth.

60. In an automatic alarm-signaling and safety system for railway-trains, the combination, with an operating bar or lever, in connection with a railway-switch or draw-bridge and a locomotive or train provided with a signaling device capable of giving a series of audible signals differing from each other in form and nature, said locomotive or train being also provided with a suitable device for controlling the supply of steam to the cylinders of the locomotive and the application of the brakes of said train, and a sliding bar or rod moving in bearings on said locomotive and suitably connected with and adapted to operate said devices, of two movable alarm inclines or elevations differing in height, placed alongside of a railroad at a distance from each other and from the switch or draw-bridge, and means whereby when the switch is moved from the main line or the draw is opened the alarm-inclines are simultaneously elevated to come into successive contact with and lift the sliding bar on a locomotive approaching the switch or bridge, thereby causing the signaling device first to give a misplaced-switch or an open-draw-bridge alarm-signal, as a warning to the engineer to slow up or stop, and then, if this warning is not obeyed before reaching the second incline, causing the latter to give a down-brakes-alarm signal and at the same moment operate the sliding bar to cut off the steam-supply and apply the brakes.

61. In an automatic alarm-signaling and safety system for railroads, the combination, with the switch-rails of a railroad-switch, the draw of a draw-bridge, and a moving locomotive or train, of a signaling device carried on said train, adapted to give, among others, a misplaced-switch, open-draw-bridge, and down-brakes signal, a suitable device, also carried by said train to control under certain conditions the supply of steam to the locomotive-cylinders and the application of the brakes of said train, a depending mechanism suitably connected with and adapted to operate either or both of said devices, inclines or elevations placed adjacent to the track-rails at a distance, respectively, from the switch and draw, said inclines being normally held out of action with respect to the depending mechanism, and a suitable mechanism connected with and adapted to be operated by the movement of the switch-rails and draw when they are placed in a position of "danger" to an approaching train to bring their respective inclines into an operative position with respect to the depending mechanism, thereby causing the latter to operate the aforesaid devices, as and for the purposes set forth.

62. In an automatic alarm-signaling and safety system for railroads, the combination, with the draw of a draw-bridge and a moving locomotive or train, of a signaling device carried by said train and adapted of itself to give either of a code of audible signals, according as it shall be set therefor, and a series of inclines or elevations of different heights placed adjacent to the track-rails at various points along the roadway, and adapted to set said signaling device to give the signals corresponding to such different heights, one of said inclines being placed at a distance from said draw-bridge, and adapted to be automatically operated by the opening of said bridge, to cause the signaling device to give a definite open-draw-bridge signal, different and clearly distinguishable from the other signals, for the purpose set forth.

63. In an automatic alarm-signaling and safety system for railroad trains, the combination of the following elements: an inclined guide or rail secured to the draw of a draw-bridge, a draw bar or rod guided in bearings in the stationary end of the bridge and adapted to be moved or reciprocated by said inclined guide or rail when the draw is opened or closed, two or more elevations, inclines, or signal-arms placed alongside of the track at different distances from the bridge, a wire, rope, or cable connecting said inclines with each other and with the draw-bar at the bridge, and a signaling mechanism on a moving locomotive or train provided with a series of signal-wheels, and adapted, when the draw is open, to be operated by the elevations or inclines to give an open-draw-bridge and down-brakes signal, for the purposes stated.

64. In an automatic alarm-signaling and safety system for railroad-trains, the combination of the following elements: an inclined guide or rail secured to the draw of a draw-bridge, a draw bar or rod guided in bearings on the stationary end of the bridge and adapted to be moved or reciprocated by said inclined guide or rail when the draw is opened or closed, two or more elevations, inclines, or signal-arms placed alongside of the track at different distances from the bridge, a combined visible and audible home-signal placed at the bridge, a wire, rope, or cable connecting the distant inclines with the home-signal and the draw-bar at the bridge, and a signaling mechanism on a moving locomotive or train, adapted to be operated by the series of elevations or inclines when the draw is open for the purpose of giving a series of audible signals.

65. In an automatic alarm-signaling and safety system for railway-trains, the combination, with the actuating draw-bar V, the primary weight $v$, the rope or cable $c$, and one or more movable alarm planes or elevations connected to said rope or cable, of the secondary or returning weight $X^3$ or spring $x$ at the distant end of said cable, whereby the said cable is constantly kept taut, substantially as set forth.

66. In an automatic draw-bridge-signal system, the combination, with the actuating draw-bar and primary weight at the draw-bridge, one or more movable inclines, elevations, or signal-arms located alongside of a railway-track and designed and adapted to cause an audible signal to be given upon a moving locomotive or train or to control the movement of said locomotive or train, and means for automatically operating said elevations or signal-arms, of a home-signal, substantially as described, located at or near the draw-bridge and operated by the said primary weight to warn a train after its motion has been entirely or partially arrested by the last of said inclines by means of both a visible and audible signal that it is or is not safe for it to proceed, substantially as described.

67. In an automatic draw-bridge-signal system, the combination, with two or more movable elevations, inclines, or signal-arms placed alongside of a railroad-track at various distances from a draw-bridge, and a suitable mechanism at the bridge adapted to operate said inclines, &c., to give a series of audible signals on and control the movement of an approaching train, of the home-signal, consisting of the post Y, the signal-arm Y', the signal-lamp $Y^2$, and the bell or gong $Y^3$, said home-signal being connected with the inclines and operated simultaneously with them, substantially as and for the purpose specified.

68. In a railroad signal and safety system, the combination, with a locomotive or train having signaling and train-stopping devices respectively adapted to give distinct slow and stop signals and to stop the motion of the train, of the herein-described draw-bridge signaling and safety system, comprising the distant alarm elevation or incline and visible signal, the intermediate alarm elevation or incline, the train-stopping elevation or incline, and the combined visual and audible home-signal, all arranged and constructed to operate substantially as set forth.

69. In an automatic signaling and safety system for railroads, the combination, with the draw of a draw-bridge and a signaling and train-stopping mechanism carried on a moving locomotive or train, of one or more alarm-inclines at a distance from the draw to give one or more audible warning-signals on said train when the draw is open, a train-stopping incline at a nearer distance from the draw to operate the train-stopping mechanism in case the warning signal or signals are not heeded, and a combined visible and audible home-signal at the bridge to notify the train when the track is clear, said inclines and home-signal being simultaneously and automatically operated by means of mechanism affected by the movement or the position of the draw.

70. An automatic alarm device for giving audible signals on a moving train or locomotive, consisting of a series of movable or pivoted inclines or elevations connected with one another by a wire, rope, or cable, and placed at suitable points along a railway-track, a primary weight or lever and suitable actuating mechanism at a draw-bridge or switch connected to one end of said rope or cable, and designed and adapted to raise or elevate said inclines or elevations above the surface of the rail when the draw of a bridge is opened or a switch is moved, a secondary weight or spring placed at the distant end of the rope or cable, substantially as described, to depress said elevations or inclines when the bridge or switch is closed or replaced, and a suitable mechanism carried on the locomotive or train to come in contact with the series of alarm inclines or elevations when said inclines or elevations are raised, and thereby give suitable alarm-signals on the whistle of or a gong or bell on said locomotive or train, for the purpose set forth.

71. In a system of alarm-signaling and safety devices for railroads, the combination and co-operation of the following elements: a signal mechanism capable of giving a number of arbitrary signals on the whistle of or a bell or other sounding body on a locomotive or train, mechanism capable of being operated in connection with the signal mechanism to regulate and control the admission of steam to the cylinders and apply the brakes of the train, mechanism placed at different points of the road to operate the signal mechanism to give the desired signals at such points, mechanism located at other points of the road, which mechanism is normally in an inoperative position with respect to the signal mechanism, but is capable of being brought into operative contact therewith in cases of danger to cause other signals of a different nature to be given by the signal mechanism, and simultaneously therewith causing the train-stopping mechanism to reduce the speed of or stop the train, by cutting off or diminishing the supply of steam to the locomotive-cylinders and applying the brakes to the train.

72. In a system of alarm-signaling and safety devices for promoting safety on railroads, the combination of the following elements: a signal mechanism capable of giving a number of arbitrary signals on the whistle of or a bell or other sounding body on a locomotive or train, mechanism capable of being operated in connection with the signal mechanism to regulate and control the admission of steam to the cylinders and apply the brakes of the train, mechanism placed at different points of the road to operate the signal mechanism to give the required signals at such points, mechanism located at other points of the road which is normally in an inoperative position with respect to the signal mechanism, and mechanism placed at the various switches, drawbridges, and other points along the road, connected with and adapted to automatically bring said mechanism into operative action with respect to the signal mechanism when the switch or draw is moved or the track otherwise placed in a position of "danger" to an approaching train, for the purposes set forth.

73. The herein-described apparatus for giving a series of distinct and separate arbitrary signals upon a steam-whistle, gong, or other sonorous body carried on a locomotive or train, consisting of a series of signal-wheels or contacting-surfaces having a succession of elevations and depressions corresponding in form to the different signals to be given, a suitable mechanism or device for producing the signals formed by such elevations and depressions upon said whistle, gong, or other body, and a sliding bar or rod connected with said apparatus and designed and adapted to cause any desired signal to be given by being moved to corresponding different heights.

74. The herein-described system of giving a series of arbitrary signals on a steam-whistle, gong, or other sonorous body carried on a locomotive or train, consisting of the combination of a signaling mechanism provided with a series of wheels or contacting surfaces having a succession of elevations and depressions corresponding to the different signals to be given, and adapted to produce the signals represented by such elevations and depressions upon said whistle, gong, or other body, and a series of inclines or elevations varying in their respective heights according to the number of signal-wheels used, said inclines or elevations being distributed along the line of the railroad at different points thereof, each incline of corresponding or relative height being adapted to produce an audible signal peculiar to and dependent upon such height upon the whistle or other sounding body on a passing locomotive without regard to the position of such incline with respect to other inclines on the line of way or to the order in which said inclines are placed.

75. The herein-described means or apparatus for automatically producing regular, uniform, and distinct audible signals upon a steam-whistle or other sounding body on a moving locomotive or train, consisting of a signal mechanism having one or more signal-wheels or analogous devices designed and adapted to be set in motion through the agency of inclines or elevations along the railway-track to operate a whistle, bell, or other sounding body on said locomotive or train, and a suitable speed regulating or governing device designed to control and regulate the motion of said signal wheel or wheels or analogous device, and thereby cause the resulting signals to be given in a uniform and regular manner, regardless of the speed of the train, substantially as set forth.

In testimony whereof I have signed my name in the presence of two subscribing witnesses.

ELIAS E. RIES.

Witnesses:
  E. A. HEINZ,
  H. C. MOHR.